United States Patent
Sanne et al.

(10) Patent No.: US 8,252,143 B2
(45) Date of Patent: Aug. 28, 2012

(54) FILLER FOR PAPER MAKING PROCESS

(75) Inventors: Erik Sanne, Mölndal (SE); Rune Kjell Andersson, Göteborg (SE); Johan Nyander, Sollentuna (SE)

(73) Assignee: Akzo Nobel N.V. (NL)

( * ) Notice: Subject to any disclaimer, the term of this patent is extended or adjusted under 35 U.S.C. 154(b) by 157 days.

(21) Appl. No.: 11/149,613

(22) Filed: Jun. 10, 2005

(65) Prior Publication Data

US 2005/0279474 A1    Dec. 22, 2005

Related U.S. Application Data

(60) Provisional application No. 60/581,784, filed on Jun. 22, 2004.

(51) Int. Cl.
*C09C 1/00*    (2006.01)
*D21H 17/69*    (2006.01)

(52) U.S. Cl. ..... 162/177; 162/158; 162/175; 162/164.1; 162/164.6; 162/181.8; 106/400; 106/401; 106/416; 106/499

(58) Field of Classification Search ............. 106/163.01, 106/172.1, 400, 401, 416, 486, 499; 162/177, 162/158, 164.1, 164.6, 175, 181.8; 536/18.7, 536/30, 43, 56, 84, 97
See application file for complete search history.

(56) References Cited

U.S. PATENT DOCUMENTS

| | | | |
|---|---|---|---|
| 3,730,830 A | 5/1973 | Driscoll | 162/146 |
| 4,525,585 A * | 6/1985 | Taguchi et al. | 536/98 |
| 4,710,270 A | 12/1987 | Sunden et al. | 162/175 |
| 4,940,785 A | 7/1990 | Stober et al. | 536/90 |
| 5,017,268 A * | 5/1991 | Clitherow et al. | 162/146 |
| 5,294,299 A * | 3/1994 | Zeuner et al. | 162/145 |
| 5,492,560 A | 2/1996 | Fairchild | 106/204 |
| 5,607,552 A | 3/1997 | Andersson et al. | 162/181.6 |
| 5,759,346 A | 6/1998 | Vinson | 162/123 |
| 6,080,277 A | 6/2000 | Oberkofler et al. | 162/157.6 |
| 6,602,994 B1 * | 8/2003 | Cash et al. | 536/30 |
| 2003/0017271 A1 * | 1/2003 | Sikkar et al. | 427/372.2 |
| 2003/0085012 A1 | 5/2003 | Jones et al. | 162/181.8 |
| 2003/0109617 A1 * | 6/2003 | Niinikoski et al. | 524/425 |
| 2003/0205344 A1 * | 11/2003 | Lasmarias et al. | 162/158 |
| 2005/0155520 A1 * | 7/2005 | Van Der Horst et al. | 106/465 |

FOREIGN PATENT DOCUMENTS

| | | |
|---|---|---|
| EP | 0 227 623 B1 | 7/1987 |
| EP | 0 758 695 B1 | 2/1997 |
| JP | 2002-201202 A * | 7/2002 |
| WO | WO 95/13324 | 5/1995 |
| WO | WO 00/17449 A1 | 3/2000 |
| WO | WO 01/86067 | 11/2001 |
| WO | WO 01/86067 A1 | 11/2001 |

OTHER PUBLICATIONS

Baler, C. "Methylcellulose & Carboxymethylcellulose: Uses in Paper Conservation" The Book and Paper Group Annual, vol. 1 [online] The American Institute for Conservation, 1982 [retrieved on Sep. 28, 2007], Retrieved from the Internet: <URL: http://aic.stanford.edu/sg/bpg/annual/v01/bp01-04.html>.*
Product Data Sheet for Sodium Carboxymethyl Cellulose, Cellulose Pharma Chem, no date [on line] [retrieved on Apr. 2, 2009], Retrieved from the Internet: <URL: http://www.cellulosepharmachem.com/sodium_carboxymethyl_cellulose_or_carmellose_sodium.html>.*
Liu et al, "Fluorescence quenching method for the determination of sodium carboxymethyl cellulose with acridine yellow or acridine orange", Spectrochimica Acta Part A, 64(2006) pp. 817-822 [on line] [retrieved on Apr. 2, 2009], Retrieved from the Internet:<URL: http://www.sciencedirect.com/science?_ob=ArticleURL&_udi=B6VNG-4J5T8DB-6&_user=2502287&_r>.*
Certified translation of JP-2002-201202 A, Schreiber Translations, Inc. 2002.*

* cited by examiner

*Primary Examiner* — Matthew Daniels
*Assistant Examiner* — Dennis Cordray
(74) *Attorney, Agent, or Firm* — Kenyon & Kenyon LLP

(57) ABSTRACT

The present invention relates to a filler comprising clay and cellulose derivative having a degree of substitution of net ionic groups up to about 0.65.

20 Claims, No Drawings

FILLER FOR PAPER MAKING PROCESS

This application claims priority based on U.S. Provisional Patent Application No. 60/581,784, filed Jun. 22, 2004.

The present invention relates to a filler comprising clay and cellulose derivative. The invention further relates to a method of making the filler, the use of the filler in papermaking, a process for papermaking in which the filler is used as an additive as well as paper comprising the filler.

BACKGROUND OF THE INVENTION

In the production of filled paper, an aqueous suspension containing cellulosic fibres, fillers and additives, referred to as the stock, is fed into a headbox which ejects the stock onto a forming wire. Water is drained from the stock through the forming wire so that a wet web of paper is formed on the wire, and the web is further dewatered and dried in the drying section of the paper machine.

Highly filled paper is an established trend in the paper industry, not only due to the savings in the decreased use of fibre, but also due to improved product quality, such as higher opacity and better printability. For super calandered paper (SC paper) and many paper grades containing mechanical fibres, kaolin clay is the most commonly used filler. The clay particles have a flake or plate shape, and at calandering the flakes are uniformly oriented, giving a high gloss and smoothness to the paper. The amount of filler can be as high as 30% or more.

A high degree of filler causes a decrease in paper strength as well as linting and dusting. A rule of thumb at filler usage in paper is that a 10% increase in filler content decreases the strength by 20%. Problems with Tinting and dusting occur, as small fibre fragments and fillers are not properly bound into the paper. This can give a specific problem at rotogravure printing of SC paper, called missing dots, when ink is missing in dots in the print.

Addition of a binding agent can increase the strength of the paper as well as decrease the Tinting and dusting. Among other materials starch has been used as a binding agent. However, in SC paper making, the calandering of the paper is done at a load of 100-350 kN/m. Starch makes the paper brittle and it can break at such heavy loads. Starch also makes the paper denser already prior to calandering. Therefore, no starch or small additions (1-2 kg/tonne dry paper) is used in SC paper making.

Conventional CMC is sometimes added to the wet end as a strength additive. However, then the problem is that dewatering is slowed down considerably. A third possibility, synthetic strength additives, can be used but they are often quite expensive.

For all paper grades with high filler loadings, paper strength, drainage and filler retention are important issues. Sometimes size is added, and then also size consumption is higher when the filler loadings are increased and/or when starch is not used.

U.S. Pat. No. 5,759,346 describes a method of improving strength and reducing lint and dust in the production of tissue paper. The filler is a kaolin clay which has been pre-treated with a cationic starch.

WO 01/86067 describes a method for pre-treating a filler with a hydrophobic polymer, which is a synthetic polymer comprising acrylate and styrene monomers. The use of the pre-treated filler improves wet strength and reduces the linting of the paper.

Furthermore, WO 95/13324 refers to calcium carbonate treated with a cellulose derivative such as sodium carboxymethyl cellulose ("CMC") having a degree of substitution of 0.70. Said treated calcium carbonate is used as filler in alkaline papermaking suspensions whereby the brightness of the paper is increased.

There is still need for a filler which provides an improved papermaking process and better properties of the paper produced. It would be desired to provide a filler which renders possible production of highly filled paper showing excellent printing and mechanical properties. It would also be desirable to provide a filler which is compatible with drainage and retention aids, and hereby leads to good drainage, retention and paper machine runnability. It would also be desirable to provide a simple and efficient process for producing a filler showing the above characteristics.

SUMMARY OF THE INVENTION

The present invention generally relates to a filler comprising clay and cellulose derivative. The present invention further generally relates to a filler comprising clay and carboxymethyl cellulose derivate. The present invention also generally relates to a method of making the filler by mixing clay with a cellulose derivative, the use of the filler as an additive in papermaking as well as paper comprising the filler. The invention further generally relates to papermaking process in which the filler is introduced into an aqueous cellulosic suspension.

More specifically, the invention relates to a filler comprising clay and a cellulose derivative having a degree of substitution of net anionic groups up to about 0.65. The invention also relates to a filler comprising clay and a cellulose derivative having a degree of substitution of carboxyalkyl groups up to about 0.65. The invention further relates to a method of producing a filler which comprises mixing clay with a cellulose derivative having a degree of substitution of net ionic groups up to about 0.65. The invention also relates to a method of producing a filler which comprises mixing clay with a cellulose derivative having a degree of substitution of carboxyalkyl groups up to about 0.65. The invention further relates to a filler obtainable by these methods. The invention further relates to a papermaking process which comprises providing an aqueous suspension containing cellulosic fibres, introducing into the suspension a filler comprising clay and cellulose derivative having a degree of substitution of net ionic groups up to about 0.65, and dewatering the suspension to form a web or sheet of paper. The invention also relates to a papermaking process which comprises providing an aqueous suspension containing cellulosic fibres, introducing into the suspension a filler comprising clay and cellulose derivative having a degree of substitution of carboxyalkyl groups up to about 0.65, and dewatering the suspension to form a web or sheet of paper. In the papermaking process, the filler can be introduced into the cellulosic suspension by adding the clay and cellulose derivative separately or together as a single composition.

DETAILED DESCRIPTION OF THE INVENTION

The present invention provides a new filler that is suitably for use in papermaking. It has surprisingly been found that the filler according to the invention makes it possible to reduce some of the problems associated with fillers commonly used in papermaking and incorporated in paper. More specifically, by employing the filler of this invention in papermaking processes it is possible to reduce the Tinting and dusting of paper and provide paper with excellent printing and mechanical properties. Additional advantages shown by the present invention include good and/or improved dewatering and fines retention, which leads to benefits in terms of paper machine runnability.

When using the filler in the making of SC paper and newsprint paper it has been observed that the present invention makes it possible to reduce the linting and dusting of the paper without adversely affecting the mechanical properties of the paper produced and without decreasing the dewatering and retention of fines and filler in the papermaking process.

According to the present invention it has been observed that the cellulose derivative can be mixed with and more effectively be adsorbed on or attached to the clay surface during simple processing. The filler of the invention can be regarded as a modified filler, or cellulose derivative-treated filler.

According to the present invention it has been found that very good results can be obtained by adding the clay and cellulose derivative to a cellulosic suspension either separately or together in a pre-mixed or pre-treated form. The pre-treatment of the clay with the cellulose derivative provides a convenient way of separately processing only one component of the cellulosic suspension to produce a modified filler, which can be used instead of or partly replacing conventional fillers. Without being bound to any theory, it is believed that cellulose derivative is adsorbed to the clay when mixing the components, which adsorption may also take place in situ in the cellulosic suspension when separately adding the components.

The filler according to the invention comprises a clay and a cellulose derivative. Examples of suitable clays include those having a flake or plate like shape. Examples of suitable clays include talc, hydrotalcit, kaolin, calcinated clay, bentonite or mixtures thereof, preferably kaolin, calcinated clay or talc, most preferably kaolin and calcinated clay. Examples of suitable clays include those having a specific surface area in the range from about 2 $m^2/g$ to about 800 $m^2/g$, suitably from about 2 $m^2/g$ to about 600 $m^2/g$, most preferably from about 5 $m^2/g$ to about 20 $m^2/g$. The particle size is usually from about 0.1 μm to about 50 μm, preferably from about 0.1 μm to about 5 μm and most preferably from about 0.8 μm to about 3 μm.

Natural kaolin clay has the chemical formula $Al_2O_3*2SiO_2*2H_2O$. Kaolin clays include so called dioctahedral 1:1 aluminium silicates. The kaolin clay usually has a particle size of from about 1 μm to about 5 μm, preferably from about 1 μm to about 3 μm. The kaolin clay usually has a surface area of from about 3 $m^2/g$ to about 10 $m^2/g$, suitably from about 5 $m^2/g$ to about 8 $m^2/g$.

Calcinated clay has the formula $Al_2O_3*SiO_2$. The calcinated clay usually has a specific surface area of from about 10 $m^2/g$ to about 20 $m^2/g$, suitably from about 15 $m^2/g$ to about 17 $m^2/g$. The calcinated clay usually has a particle size in the range of from about 0.8 μm to about 4 μm, preferably from about 0.8 μm to about 2 μm.

The filler according to the invention further comprises a cellulose derivative. It is preferred that the cellulose derivative is water-soluble or at least partly water-soluble or water-dispersible, preferably water-soluble or at least partly water-soluble. Preferably, the cellulose derivative is ionic. The cellulose derivative can be anionic, cationic or amphoteric, preferably anionic or amphoteric. Examples of suitable cellulose derivatives include cellulose ethers, e.g. anionic and amphoteric cellulose ethers, preferably anionic cellulose ethers. The cellulose derivative preferably has ionic or charged groups, or substituents. Examples of suitable ionic groups include anionic and cationic groups. Examples of suitable anionic groups include carboxylate, e.g. carboxyalkyl, sulphonate, e.g. sulphoalkyl, phosphate and phosphonate groups in which the alkyl group can be methyl, ethyl propyl and mixtures thereof, suitably methyl; suitably the cellulose derivative contains an anionic group comprising a carboxylate group, e.g. a carboxyalkyl group. The counter-ion of the anionic group is usually an alkali metal or alkaline earth metal, suitably sodium.

Examples of suitable cationic groups of cellulose derivatives according to the invention include salts of amines, suitably salts of tertiary amines, and quaternary ammonium groups, preferably quaternary ammonium groups. The substituents attached to the nitrogen atom of amines and quaternary ammonium groups can be same or different and can be selected from alkyl, cycloalkyl, and alkoxyalkyl, groups, and one, two or more of the substituents together with the nitrogen atom can form a heterocyclic ring. The substituents independently of each other usually comprise from 1 to about 24 carbon atoms, preferably from 1 to about 8 carbon atoms. The nitrogen of the cationic group can be attached to the cellulose or derivative thereof by means of a chain of atoms which suitably comprises carbon and hydrogen atoms, and optionally O and/or N atoms. Usually the chain of atoms is an alkylene group with from 2 to 18 and suitably 2 to 8 carbon atoms, optionally interrupted or substituted by one or more heteroatoms, e.g. O or N such as alkyleneoxy group or hydroxy propylene group. Preferred cellulose derivatives containing cationic groups include those obtained by reacting cellulose or derivative thereof with a quatemization agent selected from 2,3-epoxypropyl trimethyl ammonium chloride, 3-chloro-2-hydroxypropyl trimethyl ammonium chloride and mixtures thereof.

The cellulose derivatives of this invention can contain non-ionic groups such as alkyl or hydroxy alkyl groups, e.g. hydroxymeyhyl, hydroxyethyl, hydroxypropyl, hydroxylbutyl and mixtures thereof, e.g. hydroxyethyl methyl, hydroxypropyl methyl, hydroxybutyl methyl, hydroxyethyl ethyl, hydroxypropoyl and the like. In a preferred embodiment of the invention, the cellulose derivative contains both ionic groups and non-ionic groups.

Examples of suitable cellulose derivatives according to the invention include carboxyalkyl celluloses, e.g. carboxymethyl cellulose, carboxyethyl cellulose, carboxypropyl cellulose, sulphoethyl carboxymethyl cellulose, carboxymethyl hydroxyethyl cellulose ("CM-HEC"), carboxymethyl cellulose wherein the cellulose is substituted with one or more non-ionic substituents, preferably carboxymethyl cellulose ("CMC"). Examples of ° suitable cellulose derivatives and methods for their preparation include those disclosed in U.S. Pat. No. 4,940,785, which is hereby incorporated herein by reference.

The terms "degree of substitution" or "DS", as used herein, mean the number of substituted ring sites of the beta-anhydroglucose rings of the cellulose derivative. Since there are three hydroxyl groups on each anhydroglucose ring of the cellulose that are available for substitution, the maximum value of DS is 3.0. According to one preferred embodiment of the invention, the cellulose derivative has a degree of substitution of net ionic groups ("$DS_{NI}$") up to about 0.65, i.e. the cellulose derivative has an average degree of net ionic substitution per glucose unit up to about 0.65. The net ionic substitution can be net anionic, net cationic or net neutral. When the net ionic substitution is net anionic, there is a net excess of anionic groups (net anionic groups=the average number of anionic groups minus the average number of cationic groups, if any, per glucose unit) and $DS_{NI}$ is the same as the degree of substitution of net anionic groups ("$DS_{NA}$"). When the net ionic substitution is net cationic, there is a net excess of cationic groups (net cationic groups=the average number of cationic groups minus the average number of anionic groups, if any, per glucose unit) and $DS_{NI}$ is the same as the degree of substitution of net cationic groups ("$DS_{NC}$"). When the net ionic substitution is net neutral, the average number of anionic and cationic groups, if any, per glucose unit is the same, and $DS_{NI}$ as well as $DS_{NA}$ and $DS_{NC}$ are 0. According to another preferred embodiment of the invention, the cellulose derivative has a degree of substitution of carboxyalkyl groups ("$DS_{CA}$") up to about 0.65, i.e. the cellulose derivative has an average degree of carboxyalkyl substitution per glucose unit up to about 0.65. The carboxyalkyl groups are suitably carboxymethyl groups and then $DS_{CA}$ referred to herein is the same as the degree of substitution of carboxymethyl groups ("$DS_{CM}$"). According to these embodiments of the invention, $DS_{NI}$, $DS_{NA}$, $DS_{NC}$ and $DS_{CA}$ independently of each other are usually up to about 0.60, suitably up to about 0.50, preferably up to about 0.45 and more preferably up to 0.40, whereas $DS_{NI}$, $DS_{NA}$, $DS_{NC}$ and $DS_{CA}$ independently of each other are usually at least 0.01, suitably at least about 0.05, preferably at least about 0.10 and more preferably at least about 0.15. The ranges of $DS_{NI}$, $DS_{NA}$, $DS_{NC}$ and $DS_{CA}$ independently of each other are usually from about 0.01 to about 0.60, suitably from about 0.05 to about 0.50, preferably from about 0.10 to about 0.45 and more preferably from about 0.15 to about 0.40.

Cellulose derivatives that are anionic or amphoteric usually have a degree of anionic substitution ("$DS_A$") in the range of from 0.01 to about 1.0 as long as $DS_{NI}$ and $DS_{NA}$ are as defined herein; suitably from about 0.05, preferably from about 0.10, and more preferably from about 0.15 and suitably up to about 0.75, preferably up to about 0.5, and more preferably up to about 0.4. Cellulose derivatives that are cationic or amphoteric can have a degree of cationic substitution ("$DS_C$") in the range of from 0.01 to about 1.0 as long as $DS_{NI}$ and $DS_{NC}$ are as defined herein; suitably from about 0.02, preferably from about 0.03, and more preferably from about 0.05 and suitably up to about 0.75, preferably up to about 0.5, and more preferably up to about 0.4. The cationic groups are suitably quaternary ammonium groups and then $DS_C$ referred to herein is the same as the degree of substitution of quaternary ammonium groups ("$DS_{QN}$"). For amphoteric cellulose derivatives of this invention $DS_A$ or $DS_C$ can of course be higher than 0.65 as long as $DS_{NA}$ and $DS_{NC}$, respectively, are as defined herein. For example, if $DS_A$ is 0.75 and $DS_C$ is 0.15, then $DS_{NA}$ is 0.60.

Examples of suitable cellulose derivatives having degrees of substitution as defined above include the water-soluble low DS carboxyalkyl cellulose derivatives. The water-soluble cellulose derivatives suitably has a solubility of at least 85% by weight, based on total weight of dry cellulose derivative, in an aqueous solution, preferably at least 90% by weight, more preferably at least 95% by weight, and most preferably at least 98% by weight.

The cellulose derivative usually has an average molecular weight which is at least 20,000 Dalton, preferably at least 50,000 Dalton, and the average molecular weight is usually up to 1,000,000 Dalton, preferably up to 500,000 Dalton.

Preferably, in the filler according to the invention, the cellulose derivative is at least in part adsorbed on or attached to the clay. Suitably, at least about 10% by weight, preferably at least about 30% by weight, more preferably at least about 45% by weight and most preferably at least about 60% by weight of the cellulose derivate is adsorbed on or attached to the clay.

The filler according to the invention usually has a clay content of at least 0.0001% by weight; the clay content can be from about 0.0001 to about 99.5% by weight, suitably from about 0.1 to about 90% by weight, and preferably from about 60 to about 80% by weight, based on the weight of the solids of the filler, i.e. based on the dry weight of the filler. The filler usually has a cellulose derivative content of at least 0.01% by weight; the cellulose derivative content can be from about 0.01 to about 30% by weight, suitably from about 0.1 to about 20% by weight, and preferably from about 0.3 to about 10% by weight, based on the weight of the solids of the filler.

The filler according to the invention can be supplied as a solid material that can be essentially free of water. It can also be supplied as an aqueous composition. The content of aqueous phase, or water, can vary within wide limits, depending on the method of production and intended use.

The present invention also relates to a method of making a filler which comprises mixing a cellulose derivative, e.g. any one of the cellulose derivatives defined herein, with clay. The cellulose derivative and clay are suitably used in amounts so as to provide a filler according to the invention having contents of cellulose derivative and clay as defined herein.

The cellulose derivative and clay used can be present as solids or in aqueous compositions, and mixtures thereof. The clay is suitably present as a finely divided material. The mixing can be achieved by adding the cellulose derivative to the filler, or vice versa, in a batch, semi-batch or continuous process. According to a preferred embodiment of the invention, the cellulose derivative is added as a solid to an aqueous composition of the clay and the composition obtained is then suitably subjected to effective dispersing to dissolve the cellulose derivative. Preferably, the mixing is carried out by first forming a neutral to alkaline aqueous phase, suitably an aqueous solution, of cellulose derivative which is then mixed with an aqueous composition of clay. Prior to mixing with the clay, the aqueous phase of cellulose derivative can be subjected to pre-treatment, e.g. homogenisation, centrifugation and/or filtration, for example for separating undissolved cellulose derivative, if any, from the aqueous phase.

Preferably, the cellulose derivative is mixed with the clay to allow at least part of the cellulose derivative to adsorb on or attach to the clay, preferably so that it is hardly removed from the material by dilution with water. This can be accomplished by carrying out mixing under a period of time that is sufficient long to allow the adsorption on attachment. Suitably the mixing time is at least about 1 min, preferably at least about 5 min, more preferably at least about 10 min and most preferably at least about 20 min. Mixing periods of even several hours (1-10 h) are possible if it is desired to reach a high degree of attachment. Suitably, at least about 10% by weight, preferably at least about 30% by weight, more preferably at least about 45% by weight and most preferably at least about 60% by weight of the cellulose derivate is transferred from the aqueous phase and adsorbed on or attached to the clay or other components present in the clay.

The pH of the aqueous phase of cellulose derivative is usually adjusted for sorption of the specific cellulose derivative used at a value from about 4 to about 13, preferably from about 6 to about 10, more preferably from about 7 to about 8.5. A suitable base or acid can be used for adjusting the pH. Examples of suitable bases include bicarbonates and carbonates of alkali metals and alkali metal hydroxides, suitably sodium bicarbonate, sodium carbonate and sodium hydroxide. Examples of suitable acids include mineral acids, organic acids and acid salts, suitably sulphuric acid and its acid salts, such as alum. In general, at a lower pH, i.e. a pH from about 4.0 to neutral, adsorption of the cellulose derivative is higher but solubility is decreased, whereas at higher pH the adsorption is reduced but solubility is increased.

The temperature is not critical; in operations in non-pressurized conditions the temperature is typically from about 10 to about 100° C., preferably from about 20 to about 80° C. However, higher temperatures are more favourable, suitably the temperature of the aqueous composition during mixing is from about 30 up to about 70° C., more preferably from about 40 up to about 60° C.

The filler obtained by the method of the invention can be used as such, for example in papermaking. If present as an aqueous composition, it can be used directly or it can be dried, if desired, for example to simplify shipping.

The present invention also relates to a process for the production of paper which comprises providing an aqueous suspension containing cellulosic fibres ("cellulosic suspension"), introducing into the cellulosic suspension a filler, e.g. any one of the fillers defined herein, and dewatering the cellulosic suspension to form a web or sheet of paper.

Preferably, the filler is introduced into the cellulosic suspension by adding it as a single composition. Alternatively, the clay and cellulose derivative (e.g. any one of the cellulose derivatives defined herein) can be separately added to the cellulosic suspension and the filler is formed in situ in the cellulosic suspension.

The filler according to the invention can be added to the cellulosic suspension in amounts which can vary within wide limits depending on, inter alia, type of cellulosic suspension, type of paper produced, point of addition, etc. The filler is usually added in an amount within the range of from 1 to about 50% by weight, suitably from about 5 to about 40% by weight, and usually from about 10 to about 30% by weight, based on the weight of dry fibres. Accordingly, the paper according to the invention usually has a content of filler of this invention within the range of from 1 to about 50% by weight, suitably from about 5 to about 40% by weight, and usually from about 10 to about 30% by weight, based on the weight of dry fibres.

In the process, other components may of course be introduced into the cellulosic suspension. Examples of such components include conventional fillers, optical brightening agents, sizing agents, coagulant flocculants, drainage and retention aids, dry strength agents, wet strength agents, etc. Examples of suitable conventional fillers include kaolin, china clay, titanium dioxide, gypsum, talc, natural and synthetic calcium carbonates, e.g. chalk, ground marble and precipitated calcium carbonate, hydrogenated aluminum oxides (aluminum trihydroxides), calcium sulphate, barium sulphate, calcium oxalate, etc. When using the filler according to the invention together with conventional filler, the filler according to the invention can be present in an amount of at least 1% by weight, suitably at least 5% by weight, preferably at least 10% by weight, more preferable at least about 20% by weight, and suitably up to about 99% by weight, based on the dry weight of all fillers. Examples of suitable sizing agents include non-cellulose-reactive sizing agents, e.g. rosin-based sizing agents like rosin-based soaps, rosin-based emulsions/dispersions, and cellulose-reactive sizing agents, e.g. emulsions/dispersions of acid anhydrides like alkenyl succinic anhydrides (ASA), alkenyl and alkyl ketene dimers (AKD) and multimers. Examples of suitable drainage and retention aids include organic polymeric products, e.g. cationic, anionic and non-ionic polymers including cationic polyethylene imines, cationic, anionic and non-ionic polyacrylamides, cationic polyamines, cationic starch, and cationic guar; inorganic materials, e.g. aluminium compounds, anionic microparticulate materials like colloidal silica-based particles, clays of smectite type, e.g. bentonite, montmorillonite; colloidal alumina, and combinations thereof. Examples of suitable combinations of drainage and retention aids include cationic polymers and anionic microparticulate materials, e.g. cationic starch and anionic colloidal silica-based particles, cationic polyacrylamide and anionic colloidal silica-based particles as well as cationic polyacrylamide and bentonite or montmorillonite. Examples of suitable wet strength agents include polyamines and polyaminoamides. Paper containing filler according to the invention and cationic starch shows very good strength properties.

The term "paper", as used herein, include not only paper and the production thereof, but also other cellulosic fibre-containing sheet or web-like products, such as for example board and paperboard, and the production thereof. The process can be used in the production of paper from different types of aqueous suspensions of cellulosic (cellulose-containing) fibres and the suspensions should suitably contain at least 25% by weight and preferably at least 50% by weight of such fibres, based on a dry substance. The cellulosic fibres can be based on virgin fibres and/or recycled fibres, including fibres of wood or annual or perennial plants. The cellulosic suspension can be wood-containing or wood-free, and it can be based on fibres from chemical pulp such as sulphate, sulphite and organosolve pulps, mechanical pulp such as thermo-mechanical pulp, chemo-thermo-mechanical pulp, refiner pulp and ground wood pulp, from both hardwood and softwood, and can also be based on recycled fibres, optionally from de-inked pulps, and mixtures thereof. The cellulosic suspension suitably has a pH in the acid to neutral to alkaline range, e.g. from about 4 to about 10, preferably from about 5 to about 8.

The invention is further illustrated in the following Examples which, however, are not intended to limit the same. Parts and % relates to parts by weight and % by weight, respectively, unless otherwise stated.

Example 1

Fillers according to the invention have been prepared by treating clay with cellulose derivatives. Cellulose derivatives used were carboxymethyl cellulose ("CMC") and quaternary ammonium carboxymethyl cellulose ("QN-CMC"). The mole weight of the CMC was <200,000 Dalton. The clay used in the examples was kaolin clay.

The types of CMC used to treat the clay were the following:

| | |
|---|---|
| CMC 0.35 | $DS_{CA} = 0.35$ |
| CMC 0.5 | Gabrosa PA 947 Akzo Nobel $DS_{CA} = 0.5$ |
| QN-CMC | $DS_{CA} = 0.4$ and $DS_{QN} = 0.17$ |

Preparation of CMC-Modified Clay:

CMC was first dissolved into water to a consistency of 0.5% by weight. Thereafter, the CMC composition was added to the clay filler slurry and mixed during 35 to 40 minutes at a temperature of about 50° C.

Example 2

In the following example, SC paper (super calandered) was prepared using kaolin clay treated with carboxymethyl cellulose (CMC). The CMC used was QN-CMC and CMC 0.5 according to the present invention as described in Example 1. The preparation of the CMC-modified clay has been done as described in Example 1. The SC paper was then tested for ash content, total retention and linting.

The paper sheets were produced from a SC pulp furnish consisting of 80% mechanical pulp and 20% chemical pulp. The furnish suspension contained 50% clay filler, had a consistency of 0.5% by weight, pH of 7.7 and a conductivity of 0.3 mS/cm. To the pulp suspension or to the clay slurry an amount of 2% CMC/tonne dry clay was added. A retention system containing cationic polymer (Eka retention polymer PL 1510) and silica particles (Eka retention silica NP 442) was also added. Both the polymer and silica particles were added in an amount of 0.2 kg/tonne dry fibres. The addition sequence was the following:

| Addition of separate CMC when used: | 0 sec. |
|---|---|
| Addition of filler: | 15 sec. |
| Addition of retention polymer: | 30 sec. |
| Addition of retention silica: | 45 sec. |
| Sheet making: | 105 sec. |

The paper sheets prepared in the following examples were made according to standard using a Dynamical Sheet Former ("Formette", CTP Grenoble).

The paper sheets were tested for retention and ash content, see table 1. Separate CMC 0.5 means that the CMC 0.5 was added before the untreated clay.

TABLE 1

| Test No. | Type of CMC and addition | Ash level [%] | Total retention [%] |
|---|---|---|---|
| 1 | QN-CMC on clay | 39.8 | 83.0 |
| 2 | CMC 0.5 on clay | 34.2 | 76.0 |
| 3 | Separate CMC 0.5 | 36.1 | 78.2 |

The sheets were also tested for linting, see table 2. Linting is measured by applying a well defined adhesive tape to an area of the paper surface and then mechanically draw off the tape at a specific force and angle. The amount of lint, fibre fragments and filler, present on the tape is then measured. This measurement was also made after calandering the paper sheets.

TABLE 2

| Test No. | Type of CMC and addition | Linting [mg] No calandering | Linting [mg] After calandering |
|---|---|---|---|
| 1 | QN-CMC on clay | 2.5 | 4.5 |
| 2 | CMC 0.5 on clay | 4.2 | 9.4 |
| 3 | Separate CMC 0.5 | 4.3 | 10.0 |

Example 3

In this example, newsprint paper was prepared using a clay treated with CMC. The CMC used was CMC 0.35 and CMC 0.5 as defined in example 1. The clay used was a kaolin clay. The preparation of the CMC-modified clay ha been done as described in Example 1. Tensile strength index was measured on the paper and the results are displayed in table 3.

Paper sheets were produced from a newsprint pulp furnish consisting of 75% mechanical pulp and 25% de-inked newsprint pulp. The furnish suspension contained 10% calcinated clay filler, had a consistency of 0.3%, pH of 7.2 and conductivity of 1.0 mS/cm. To the pulp suspension or to the clay slurry an amount of 2% CMC/tonne dry clay was added. The addition sequence was the following:

| Addition of separate CMC when used: | 0 sec. |
|---|---|
| Addition of filler: | 15 sec. |
| Sheet making: | 105 sec. |

The paper sheets prepared in the following examples were made according to standard using a Dynamical Sheet Former ("Formette", CTP Grenoble).

Separate CMC 0.5 means that the CMC 0.5 was added before the untreated clay.

TABLE 3

| Test No. | Type of CMC and addition | Tensile index [kNm/kg] |
|---|---|---|
| 1 | CMC 0.35 on clay | 31.5 |
| 2 | CMC 0.5 on clay | 29.3 |
| 3 | Separate CMC 0.5 | 29.6 |

Example 4

A SC paper furnish was prepared using a clay treated with CMC. Three different kinds of CMC were used to prepare the filler, CMC 0.35, CMC 0.5 and QNC-CMC according to the present invention. The types of CMC are as defined in example 1. The preparation of the CMC-modified clay have been done as described in Example 1, but the CMC and clay filler slurry has been mixed for 15 minutes or 4 hours respectively.

The SC paper furnish that was used consisted of 80% mechanical pulp and 20% chemical pulp. The furnish suspension contained 50% clay filler, had a consistency of 0.25%, pH of 7.8 and conductivity of 0.3 mS/cm. To the clay slurry an amount of 2% CMC/tonne dry clay was added and to the pulp suspension a retention system containing cationic polymer (Eka retention polymer PL 1510) and silica particles (Eka retention silica NP 780) was added. Both the polymer and silica particles were added in an amount of 1 kg/tonne dry fibres. The addition sequence was the following:

| Addition of CMC treated filler: | 0 sec. |
|---|---|
| Addition of retention polymer: | 15 sec. |
| Addition of retention silica: | 30 sec. |
| Dewatering: | 45 sec. |

The dewatering values are presented in table 4.

TABLE 4

| Test No. | Type of CMC | Pre-treatment of filler for 4 hours Dewatering time (s) | Pre-treatment of filler for 15 minutes Dewatering time (s) |
|---|---|---|---|
| 1 | CMC 0.35 | 45.0 | 48.8 |
| 2 | QN-CMC | 40.4 | 33.0 |
| 3 | CMC 0.5 | 64.7 | 58.7 |

The invention claimed is:
1. A filler consisting essentially of modified clay and cellulose derivative being an anionic carboxyalkyl cellulose having a degree of substitution of net ionic groups from about 0.15 up to about 0.40, a degree of substitution of carboxyalkyl groups from about 0.10 up to 0.40, and a degree of substitution of cationic quaternary ammonium groups from about 0.05 up to about 0.50, the cationic quaternary ammonium groups being obtained by reacting cellulose or derivatives thereof with a quaternization agent selected from 2, 3 epoxypropyl trimethyl ammonium chloride, 3-chloro-2-hydroxypropyl trimethyl ammonium chloride and mixtures thereof, wherein the clay has been modified by said cellulose derivative, and the filler has a cellulose derivative content of at least 0.01% by weight.

2. The filler according to claim 1, wherein the cellulose derivative is a cellulose ether.

3. The filler according to claim 1, wherein the cellulose derivative contains carboxymethyl groups.

4. The filler according to claim 1, wherein the cellulose derivative is amphoteric.

5. The filler according to claim 1, wherein the cellulose derivative is at least partly water soluble.

6. The filler according to claim 1, wherein it has a cellulose derivative content from 0.3 to 10% by weight, based on the weight of the solids of the filler.

7. The filler according to claim 1, wherein it has a clay content from 60 to about 80% by weight, based on the weight of the solids of the filler.

8. The filler according to claim 1, wherein the clay is a kaolin clay.

9. The filler according to claim 1, wherein the clay is calcinated clay.

10. The filler according to claim 1, wherein the clay is talc.

11. Paper comprising a filler according to claim 1.

12. The paper according to claim 11, wherein the total filler content of the paper is from 5 to 40% by weight, based on dry paper.

13. An aqueous filler composition consisting essentially of water, modified clay; and cellulose derivative being an anionic carboxyalkyl cellulose having a degree of substitution of net ionic groups of from about 0.15 up to about 0.40, a degree of substitution of carboxyalkyl groups from about 0.10 up to 0.40, and a degree of substitution of cationic quaternary ammonium groups from about 0.05 up to about 0.50, the cationic quaternary ammonium groups being obtained by reacting cellulose or derivatives thereof with a quaternization agent selected from 2, 3 epoxypropyl trimethyl ammonium chloride, 3-chloro-2-hydroxypropyl trimethyl ammonium chloride and mixtures thereof, wherein the clay has been modified by said cellulose derivative, and the filler has a cellulose derivative content of at least 0.01% by weight.

14. The filler according to claim 13, wherein the cellulose derivative is amphoteric.

15. The filler according to claim 13, wherein the cellulose derivative is at least partly water soluble.

16. The filler according to claim 13, wherein the clay is a kaolin clay.

17. The filler according to claim 13, wherein the clay is calcinated clay.

18. Paper comprising an aqueous filler according to claim 13.

19. A filler consisting essentially of modified clay and cellulose derivative being an anionic carboxyalkyl cellulose having a degree of substitution of net ionic groups of around 0.23 and containing cationic quaternary ammonium groups, wherein the clay has been modified by said cellulose derivative, and the filler has a cellulose derivative content of at least 0.01% by weight.

20. An aqueous filler composition consisting essentially of water, modified clay; and cellulose derivative being an anionic carboxyalkyl cellulose having a degree of substitution of net ionic groups of around 0.23 and containing cationic quaternary ammonium groups, wherein the clay has been modified by said cellulose derivative, and the filler has a cellulose derivative content of at least 0.01% by weight.

* * * * *